(12) United States Patent
Koshiyama et al.

(10) Patent No.: US 12,123,468 B2
(45) Date of Patent: Oct. 22, 2024

(54) BRAKE PAD FOR A BICYCLE

(71) Applicant: SHIMANO INC., Sakai (JP)

(72) Inventors: Kazuki Koshiyama, Sakai (JP); Yusuke Hosomi, Sakai (JP)

(73) Assignee: SHIMANO INC., Sakai (JP)

( * ) Notice: Subject to any disclaimer, the term of this patent is extended or adjusted under 35 U.S.C. 154(b) by 259 days.

(21) Appl. No.: 17/542,081

(22) Filed: Dec. 3, 2021

(65) Prior Publication Data

US 2023/0175562 A1     Jun. 8, 2023

(51) Int. Cl.
*F16D 65/092* (2006.01)
*B62L 1/00* (2006.01)
*F16D 65/847* (2006.01)

(52) U.S. Cl.
CPC ............ *F16D 65/092* (2013.01); *B62L 1/005* (2013.01); *F16D 65/847* (2013.01)

(58) Field of Classification Search
CPC .... F16D 65/092; F16D 65/847; F16D 65/097; F16D 2055/007; B62L 1/005
See application file for complete search history.

(56) References Cited

U.S. PATENT DOCUMENTS

| | | | |
|---|---|---|---|
| 3,638,764 A * | 2/1972 | Anders | F16D 66/02 188/73.1 |
| 9,273,740 B2 * | 3/2016 | Moore | F16D 65/847 |
| 2014/0151168 A1 * | 6/2014 | Wen | F16D 65/847 188/251 R |
| 2015/0122596 A1 | 5/2015 | Ruopp | |
| 2016/0245352 A1 | 8/2016 | Iwai et al. | |
| 2021/0231182 A1 * | 7/2021 | Dreher | F16D 65/095 |

FOREIGN PATENT DOCUMENTS

| | | |
|---|---|---|
| CN | 105909698 A | 8/2016 |
| DE | 10 2012 209 341 A1 | 12/2013 |
| GB | 2051981 A | 1/1981 |
| GB | 2523090 A | 8/2015 |
| JP | H09-229109 A | 9/1997 |
| JP | 2006-275225 A | 10/2006 |

OTHER PUBLICATIONS

Korean Patent No. KR 20080074112 to Scott published on Aug. 12, 2008.*

* cited by examiner

*Primary Examiner* — Pamela Rodriguez
(74) *Attorney, Agent, or Firm* — Oliff PLC

(57) ABSTRACT

A brake pad for a bicycle includes a friction member and a support plate. The friction member configured to contact a disc in a state in which the brake pad is installed in a caliper on the bicycle. The support plate supports the friction member and includes a mounting hole. The mounting hole has a first dimension in a first direction parallel to a radial direction of the disc in a state in which the brake pad is installed in the caliper on the bicycle. The mounting hole has a second dimension in a second direction orthogonal to the first direction, and the second dimension is larger than the first dimension.

19 Claims, 9 Drawing Sheets

BRAKE PAD FOR A BICYCLE

BACKGROUND

In recent years, bicycles, electric bicycles, and other small vehicles have been provided with hydraulic brake systems to increase braking performance. The hydraulic brake system is typically actuated by a hydraulic operating apparatus such as a brake lever that causes a friction member on a brake pad to contact a disc attached to a wheel of the bicycle. Friction resulting from the contact of the friction member with the disc slows the rotation of the disc when the wheel is rotating, and thus slows the rotation of the wheel.

SUMMARY

Bicycles, and especially mountain bicycles and gravel bicycles, are subject to jolts and vibrations when being ridden over the rough terrain for which they are designed. These jolts and vibrations can cause rattling of components on the bicycle. One component prone to rattling is the brake pad, which can rattle within the caliper when the bicycle is jolted or vibrated. This rattling can be annoying to a rider and/or give the rider the impression that the brake system is not adjusted properly. Thus, there is a demand to reduce or prevent the ability of the brake pad to rattle within the caliper. Exemplary embodiments of the inventive brake pad for a bicycle described herein address this need. For example, exemplary embodiments provide brake pad that with an attachment structure that limits the ability of the brake pad to rattle within the caliper.

According to a first aspect of one or more exemplary embodiments, a brake pad for a bicycle includes a friction member and a support plate. The friction member configured to contact a disc in a state in which the brake pad is installed in a caliper on the bicycle. The support plate supports the friction member and includes a mounting hole. The mounting hole has a first dimension in a first direction parallel to a radial direction of the disc in a state in which the brake pad is installed in the caliper on the bicycle. The mounting hole has a second dimension in a second direction orthogonal to the first direction, and the second dimension is larger than the first dimension.

According to this configuration, the relatively smaller first dimension restricts movement of the brake pad within the caliper in the caliper the direction of the first dimension. By restricting such movement, rattling of the brake pad within the caliper is beneficially reduced or prevented.

According to a second aspect of one or more exemplary embodiments, the brake pad according to the first aspect is configured so that the mounting hole is configured to accept a pin for mounting the brake pad in the caliper. This configuration restricts movement of the brake pad within the caliper in the direction of the first dimension to beneficially reduce or prevent rattling.

According to a third aspect of one or more exemplary embodiments, the brake pad according to the second aspect is configured so that the second dimension is sized to permit movement of the brake pad in the second direction in the state in which the brake pad is installed in the caliper on the bicycle. This configuration beneficially permits some movement of the brake pad in a direction that does not result in unwanted rattling.

According to a fourth aspect of one or more exemplary embodiments, the brake pad according to the second or third aspect is configured so that the pin prevents movement of the brake pad in the first direction in the state in which the brake pad is installed in the caliper on the bicycle. This configuration restricts movement of the brake pad within the caliper in the direction of the first dimension to beneficially reduce or prevent rattling.

According to a fifth aspect of one or more exemplary embodiments, a brake pad for a bicycle includes a friction member and a support plate. The friction member is configured to contact a disc in a state in which the brake pad is installed in a caliper on the bicycle. The support plate supports the friction member and includes a mounting hole. The mounting hole has a first dimension sized to prevent movement in a first direction parallel to a radial direction of the disc in a state in which a pin is inserted into the mounting hole while the brake pad is installed in the caliper on the bicycle. The mounting hole has a second dimension sized to permit movement in a second direction orthogonal to the first direction in the state in which the pin is inserted into the mounting hole while the brake pad is installed in the caliper on the bicycle.

According to this configuration, the relatively smaller first dimension restricts movement of the brake pad within the caliper in the caliper the direction of the first dimension. By restricting such movement, rattling of the brake pad within the caliper is beneficially reduced or prevented.

According to a sixth aspect of one or more exemplary embodiments, the brake pad according to any one of the first through fifth aspects is configured so the second direction is parallel to a longitudinal direction of the brake pad. Movement of the brake pad within the caliper in a direction parallel to a longitudinal direction of the brake pad doesn't contribute as much to unwanted rattling and/or is prevented by other means. Thus, permitting the second dimension to be larger than the first dimension allows for easier fitting of the pad on the pin within the caliper without contributing to unwanted rattling.

According to a seventh aspect of one or more exemplary embodiments, the brake pad according to any one of the second through sixth aspects is configured so the first dimension is substantially the same as a diameter of the pin. This configuration restricts movement of the brake pad within the caliper in the direction of the first dimension to beneficially reduce or prevent rattling.

According to an eighth aspect of one or more exemplary embodiments, the brake pad according to any one of the second through seventh aspects is configured so the first dimension is no more than 0.15 mm larger than the diameter of the pin. This configuration restricts movement of the brake pad within the caliper in the direction of the first dimension to beneficially reduce or prevent rattling.

According to a ninth aspect of one or more exemplary embodiments, the brake pad according to any one of the second through eighth aspects is configured so the first dimension is no more than 1.05 times the diameter of the pin. This configuration restricts movement of the brake pad within the caliper in the direction of the first dimension to beneficially reduce or prevent rattling.

According to a tenth aspect of one or more exemplary embodiments, the brake pad according to any one of the second through ninth aspects is configured so the second dimension is at least 0.625 mm larger than a diameter of the pin. This configuration allows for easier fitting of the pad on the pin within the caliper without contributing to unwanted rattling.

According to an eleventh aspect of one or more exemplary embodiments, the brake pad according to any one of the second through tenth aspects is configured so the second dimension is larger than 1.2 times a diameter of the pin. This configuration allows for easier fitting of the pad on the pin within the caliper without contributing to unwanted rattling.

According to a twelfth aspect of one or more exemplary embodiments, the brake pad according to any one of the first through eleventh aspects is configured so the second dimension is larger than 1.1 times the first dimension. This configuration allows for easier fitting of the pad on the pin within the caliper without contributing to unwanted rattling.

According to a thirteenth aspect of one or more exemplary embodiments, the brake pad according to any one of the first through twelfth aspects is configured so the second dimension is sized to allow the brake pad to move in the second direction in the state in which the brake pad is installed in the caliper on the bicycle. This configuration allows for easier fitting of the pad on the pin within the caliper without contributing to unwanted rattling.

According to a fourteenth aspect of one or more exemplary embodiments, the brake pad according to any one of the first through thirteenth aspects is configured so the mounting hole is in a shape of an obround.

According to this configuration, the obround shape restricts movement of the brake pad in a direction likely to cause unwanted rattling of the brake pad within the caliper while allowing movement in a direction unlikely to cause unwanted rattling of the brake pad within the caliper. By restricting such movement, rattling of the brake pad within the caliper is beneficially reduced or prevented.

According to a fifteenth aspect of one or more exemplary embodiments, a brake pad for a bicycle includes a friction member and a support plate. The friction member is configured to contact a disc in a state in which the brake pad is installed in a caliper on the bicycle. The support plate supports the friction member and includes a mounting hole. The mounting hole is configured to accept a pin and is in a shape of an obround. The mounting hole is oriented so that a longitudinal direction of the mounting hole corresponds to a longitudinal direction of the support plate.

According to this configuration, the obround shape restricts movement of the brake pad in a direction likely to cause unwanted rattling of the brake pad within the caliper while allowing movement in a direction unlikely to cause unwanted rattling of the brake pad within the caliper. By restricting such movement, rattling of the brake pad within the caliper is beneficially reduced or prevented.

According to a sixteenth aspect of one or more exemplary embodiments, the brake pad according to any one of the first through fifteenth aspects is configured so the mounting hole has at least two parallel sides. This configuration allows for the brake pad to move laterally relative to the pin while the pin is in the mounting hole.

According to a seventeenth aspect of one or more exemplary embodiments, the brake pad according to any one of the first through sixteenth aspects is configured so the support plate includes a cooling fin. This configuration allows for the brake pad to more quickly dispel heat that has been generated by the friction of the friction member.

According to an eighteenth aspect of one or more exemplary embodiments, the brake pad according to the seventeenth aspect is configured so the cooling fin is provided on a first side of the support plate with respect to the mounting hole in the second direction, and the friction member is supported on a second side of the support plate opposite to the first side with respect to the mounting hole in the second direction. This configuration allows for the cooling fins to be exposed to a relative wind created by movement of the bicycle to even more quickly dispel heat that has been generated by the friction of the friction member.

DETAILED DESCRIPTION OF EXEMPLARY EMBODIMENTS

It will be apparent to the skilled artisan in the small vehicle field, and in particular the bicycle field, from this disclosure that the following descriptions of exemplary embodiments are provided as examples that inform and provide support for the appended claims, but the particular details of the examples need not limit the broad inventive principles described herein or included in the appended claims.

Figure 1:
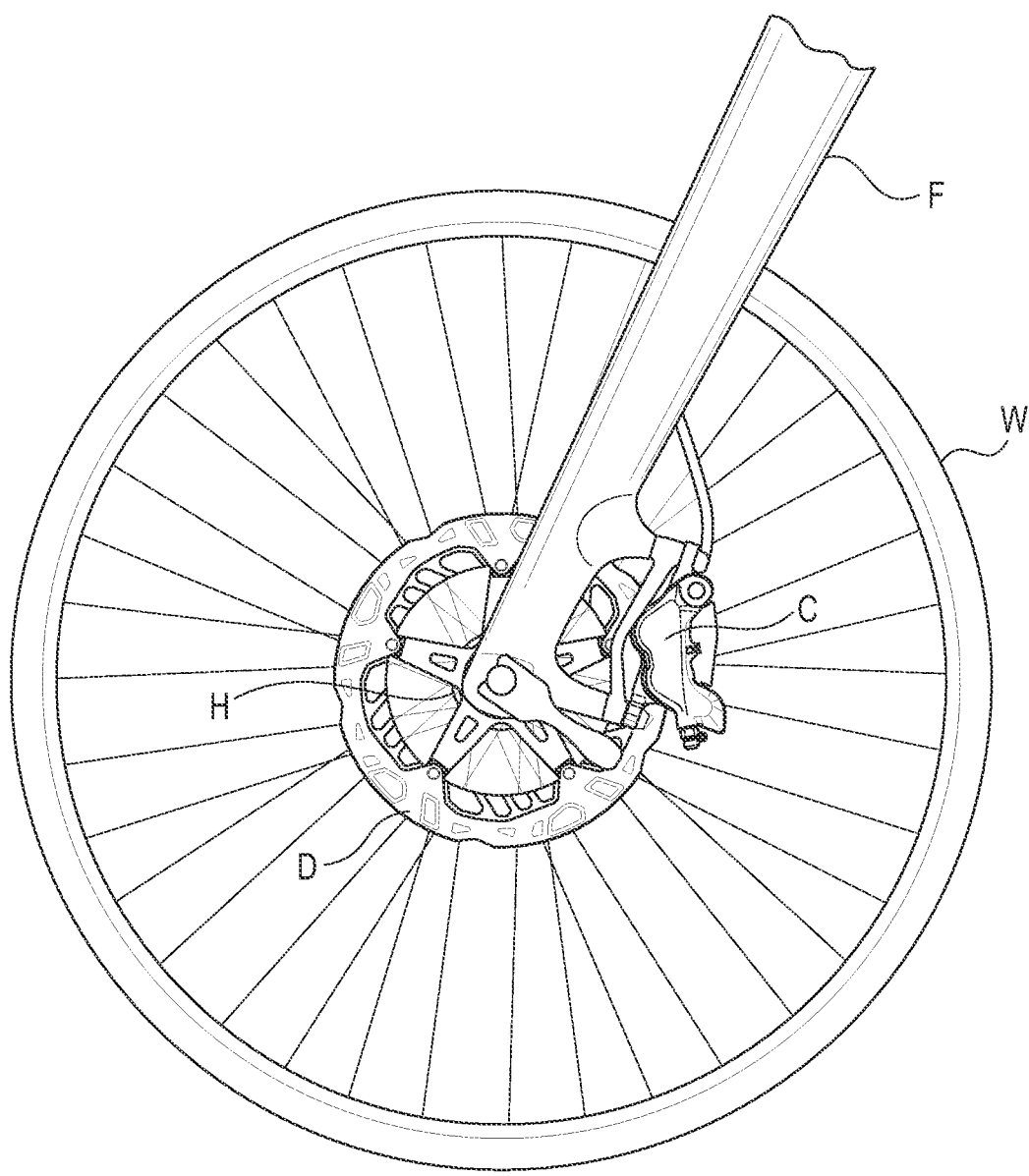
FIG. 1 shows an exemplary hydraulic brake system.

As described above, bicycles, electric bicycles, and other small vehicles can be provided with hydraulic brake systems to increase braking performance. An exemplary hydraulic brake system is shown in FIG. 1. In general, a disc D (sometimes referred to as a "rotor") is attached to the hub H of a bicycle wheel W. A brake caliper C is mounted on a front fork F of the bicycle. The front fork F can be a rigid fork, as is commonly used on a road or gravel bicycle, or a suspension fork, as is commonly used on a mountain bike. As shown in FIG. 1, and explained in more detail later, the disc D passes through a gap in the caliper C and between two brake pads that are inside the caliper C. When hydraulic braking force is applied to an actuator (not shown), each side of the disc D is forcibly contacted by a respective one of the brake pads within the caliper C. The contact of the brake pads with the disc D creates friction that slows the rotation of the disc D. Because the disc D is attached to the hub H of the wheel W, the slowing of the rotation of the disc D correspondingly slows the rotation of the wheel W to effectuate braking of the bicycle.

Although, only a front wheel W is depicted in the exemplary system of FIG. 1, in most applications, a similar system is also applied to the rear wheel of the bicycle. That is, although it is mounted in a different location, the structure of the caliper C is essentially the same for the front wheel W and rear wheel. Thus, any differences between the front and rear systems are immaterial to this disclosure and need not be described herein.

Figure 2:
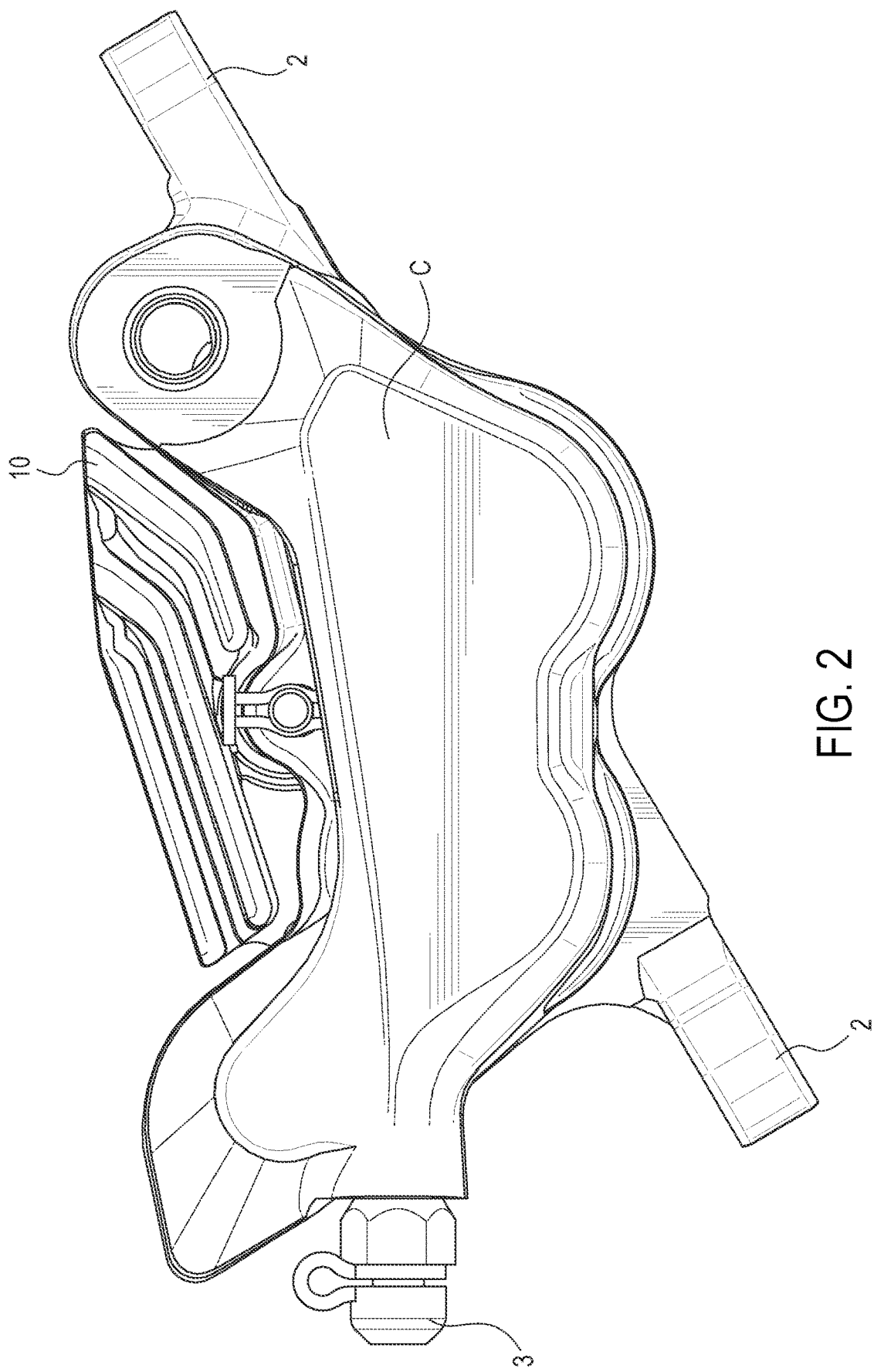
FIG. 2 shows an exemplary embodiment of a caliper.
Figure 3:
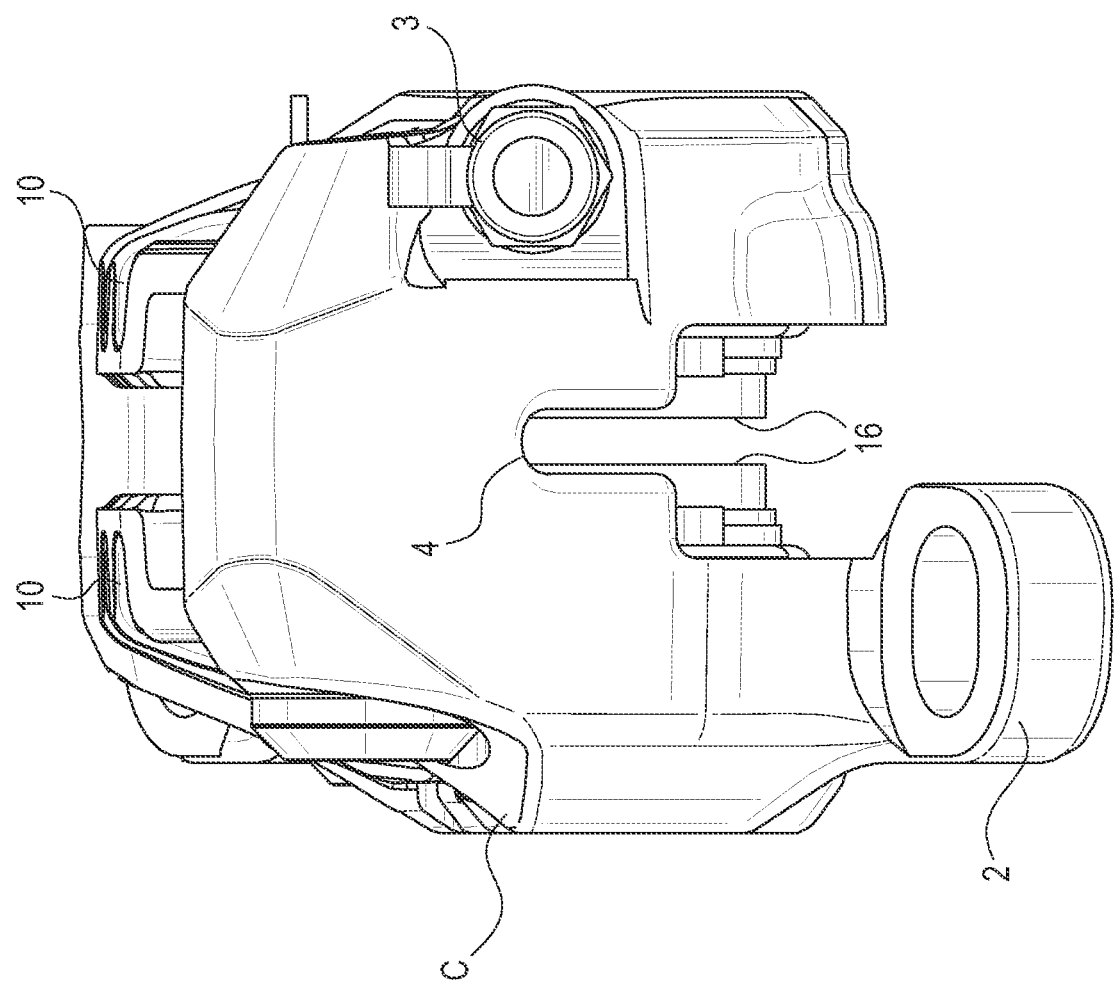
FIG. 3 shows an exemplary embodiment of a caliper.

FIGS. 2 and 3 show an exemplary embodiment of a caliper C containing brake pads 10. In general, the caliper C may include two attachment points 2 for attaching the caliper C to the bicycle, a bleed port 3 for bleeding hydraulic fluid, and an internal gap 4, for allowing the disc D to pass between the brake pads 10 within the caliper C. A friction member 16 is configured to contact the disc D in a state in which the brake pad 10 is installed in the caliper C on the bicycle. Friction members 16 of each brake pad 10, which forcibly contact the disc D to effectuate braking, can be seen through the gap 4.

Figure 4:
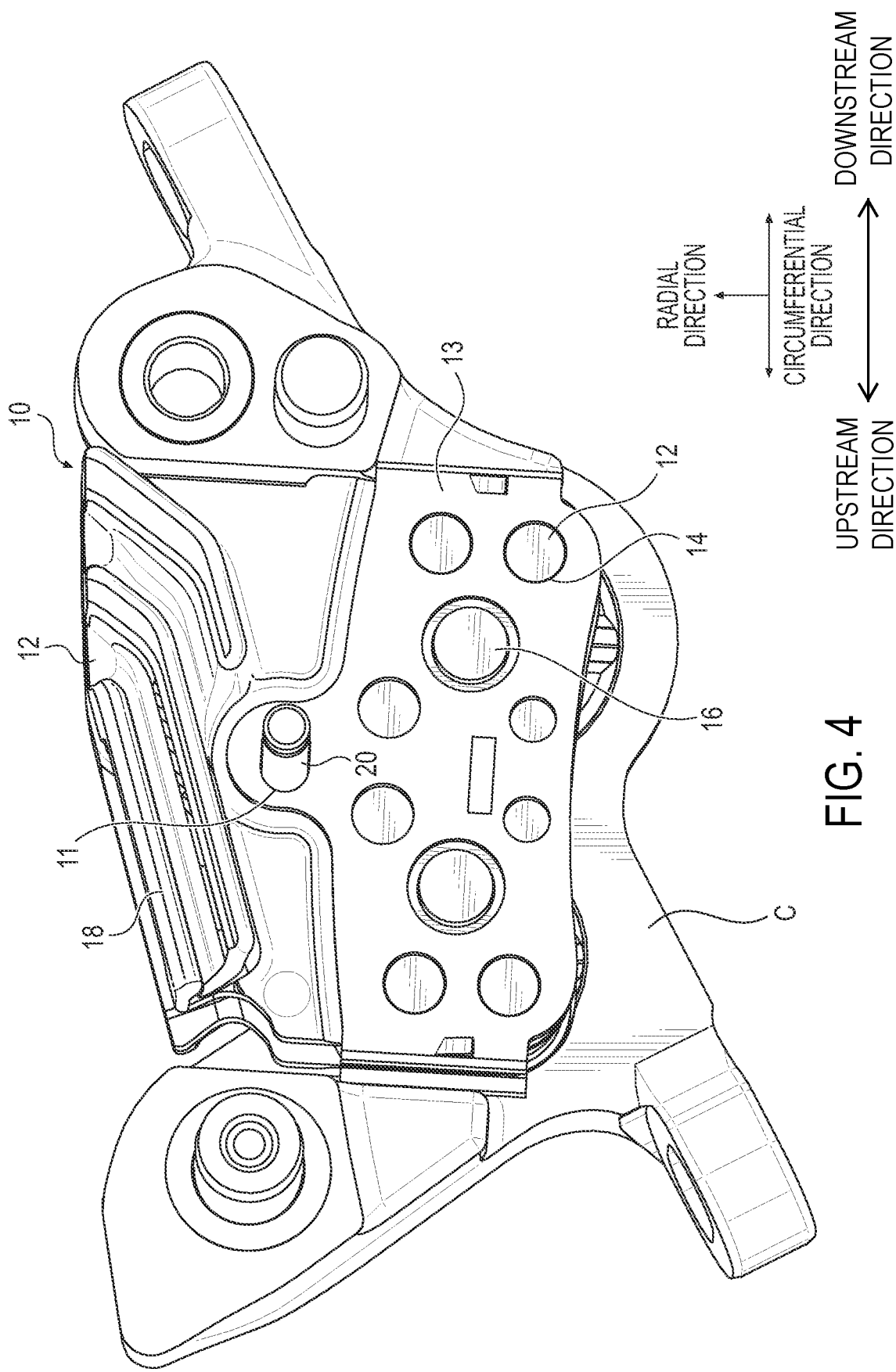
FIG. 4 shows the exemplary embodiment of the caliper with a part of the caliper removed.

FIG. 4 shows an outward facing surface of an exemplary embodiment of the brake pad 10 installed within the caliper C. In FIG. 4, part of the caliper C is removed (i.e., not shown) so the mounting of the brake pad 10 inside the caliper C can be clearly seen. Here, "outward facing" means the surface of the brake pad 10 that faces away from the disc and towards an inner surface of the caliper C. As can be seen, the brake pad 10 includes a support plate 12 that supports the friction member 16. The friction member 16 is adhered or otherwise fixed to an inward facing side (shown in FIG. 6) of the support plate 12. The support plate 12 can include a reinforcement plate 13, which can include a number of holes 14. Cylindrical projections of the support plate 12 and/or friction member 16 may protrude into the holes 14. This way, the cylindrical projections can help prevent movement of the support plate 12 relative to the reinforcement plate 13 and the friction member 16 relative to the support plate 12. This arrangement can be especially useful to prevent movement of the support plate 12 relative to the reinforcement plate 13 and/or friction member 16 relative to the support plate 12 in a circumferential direction of the disc D under braking load. The support plate 12 can be made from plastic, resin, polymer, alloy, or any other suitable material. The reinforcement plate 13 can be made from steel, other alloys, or any other suitable material.

The support plate 13 includes a mounting hole 11. The mounting hole 11 is configured to accept a pin 20 for mounting the brake pad 10 in the caliper C. In this embodiment, the brake pad 10 also includes the mounting hole 11 through which a cylindrical mounting pin 20 is inserted to mount the brake pad 10 within the caliper C. As shown in FIG. 4, the pin 20 is located in an upstream end of the mounting hole 11 when the brake pad 10 is mounted on the pin 20. As used herein, "upstream" describes a circumferential direction of the disc D in a direction opposite to the rotation of the disc D when the bicycle is moving forward, and "downstream" describes a circumferential direction of the disc D in the direction of the rotation of the disc D. Locating the pin 20 in the upstream end of the mounting hole 11 can be achieved, for example, by the structure described in Applicant's co-pending application Ser. No. 17/542,143, which is incorporated by reference herein in its entirety. This mounting system allows the brake pad 10 to be replaced, for example, when the friction member 16 has eroded from use. In the embodiment shown, the mounting hole 11 passes through both the support plate 12 and reinforcement plate 13. The mounting hole 11 will be described in more detail below with respect to FIGS. 5-7.

Figure 5:
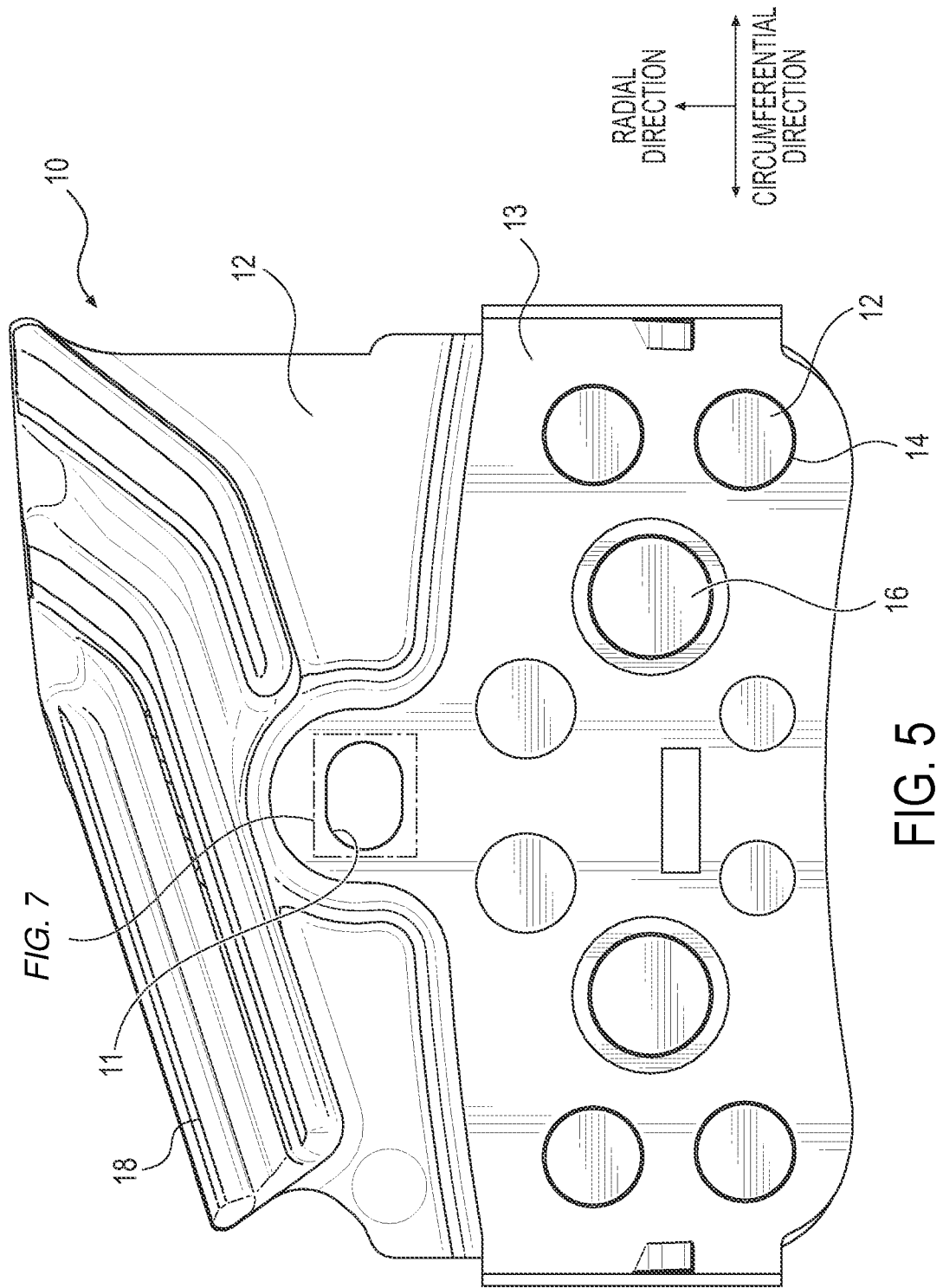
FIG. 5 shows an exemplary embodiment of the brake pad.
Figure 6:
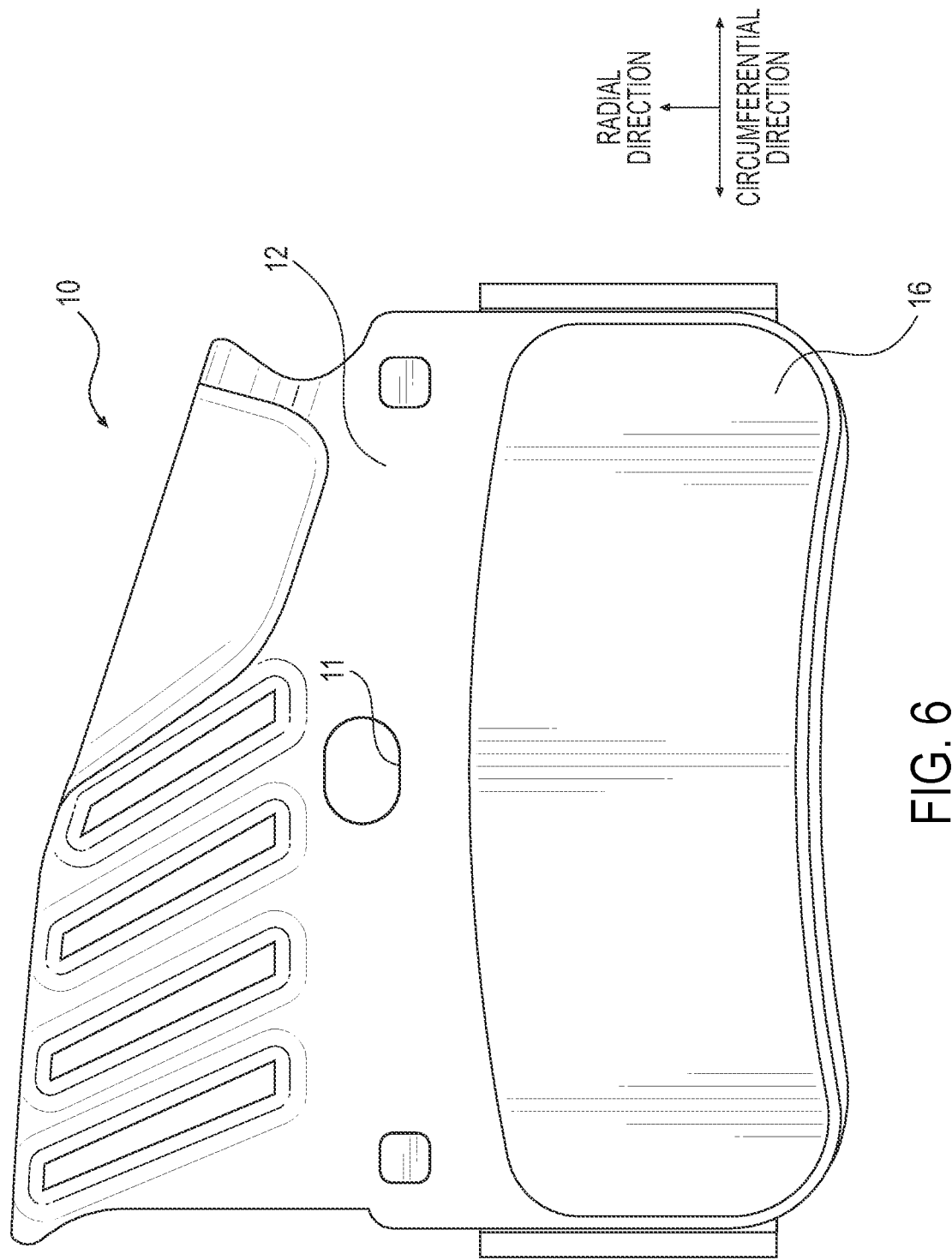
FIG. 6 shows an opposite side of the exemplary embodiment of the brake pad.

FIGS. 5 and 6 show the brake pad 10 removed from the caliper C. FIG. 5 shows the side of the brake pad 10 that is outward facing (faces away from the disc D and towards an inner surface of the caliper C). FIG. 6 shows the side of the brake pad 10 that is inward facing (faces away from the inner surface of the caliper C and towards the disc D). As shown in FIGS. 5 and 6, the mounting hole 11 is in a shape of an obround. As such, the mounting hole 11 has at least two parallel sides. The term "obround" is used herein according to its geometric definition, which is "a shape consisting of two semicircles connected by parallel lines tangent to their endpoints." This shape is sometimes also referred to as a "stadium." The shape is sometimes, more commonly, but less precisely, referred to as an "elongated circle" or "elongated hole." In other embodiments, the shape of the mounting hole 11 can be an elongated shape that is not strictly an obround as long as a dimension of the shape in a direction parallel to a radial direction of the disc D is longer than a dimension of the shape in a direction parallel to the circumferential direction of the shape. Thus, for example, the mounting hole 11 could alternatively be an oval, a rounded rectangle, or a rectellipse. In other embodiments, the mounting hole 11 could even have a rectangle shape if, for example, the mounting pin 20 had a square cross-sectional shape or a cross-sectional shape that was otherwise flattened on a top and bottom surface.

Configuring the mounting hole 11 in the shape of obround, or another of the shapes discussed above, allows the mounting hole 11 to be the same size or almost the same size as the mounting pin 20 in a direction parallel to the radial direction of the disc D while being slightly larger than the mounting pin 20 in a circumferential direction of the disc D (which a the location of the mounting pin 20 is orthogonal to the radial direction of the disc). By making the mounting hole 11 to be the same size or almost the same size as the mounting pin 20 in a direction parallel to the radial direction of the disc D, movement of the brake pad 10 relative to the mounting pin 20 is entirely prevented, or at least limited, to prevent or reduce the brake pad 10 from rattling within the caliper C as a result of movement of the brake pad 10 within the caliper C in a direction parallel to the radial direction of the disc D. At the same time, making the mounting hole 11 slightly larger than a circumference of the mounting pin 20 in a circumferential direction of the disc D, allows for easier mounting of the brake pad 10 on the mounting pin 20 because rattling resulting from movement in a direction orthogonal to the radial direction of the disc D is either less of a concern and/or can be prevented by other structure within the caliper C (such as, for example, by the structure described in Applicant's co-pending application Ser. No. 17/542,143, which is incorporated by reference herein in its entirety).

Figure 7:
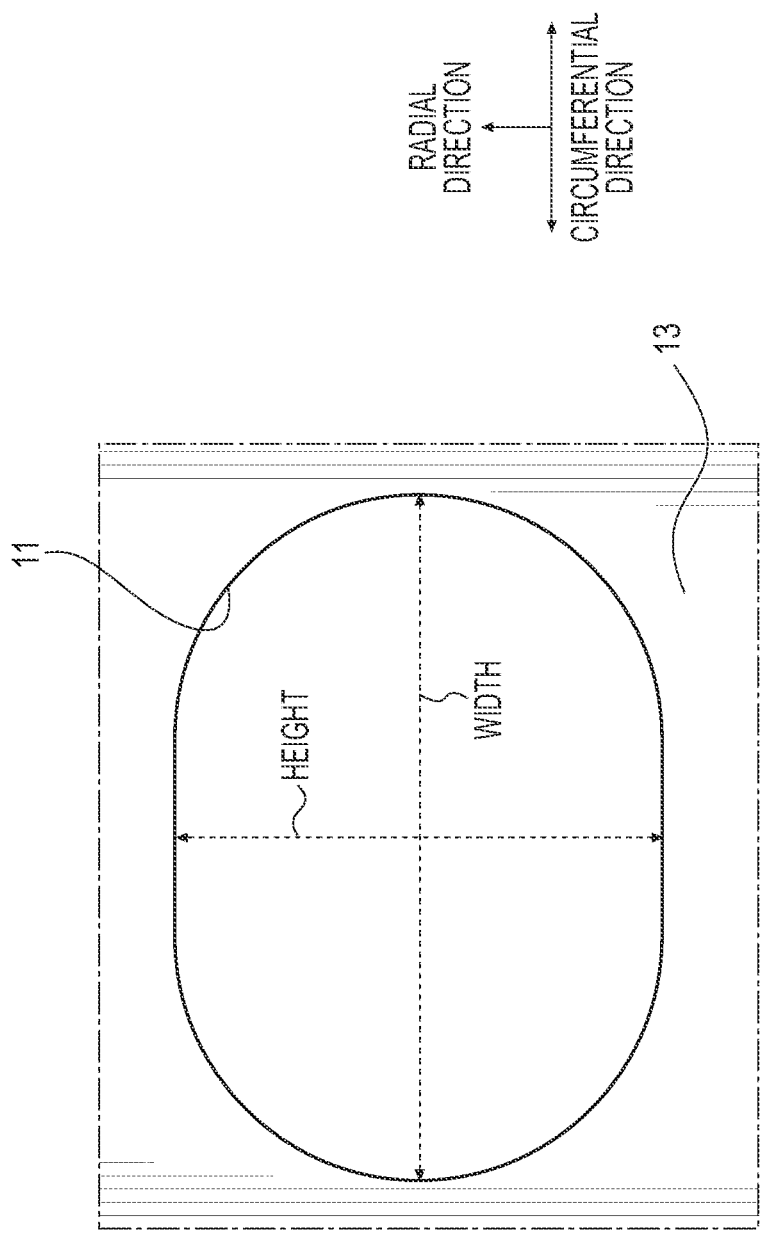
FIG. 7 shows an enlargement of the area labeled "FIG. 7" in FIG. 5.

FIG. 7 shows an enlargement of the area labeled "FIG. 7" in FIG. 5. In particular, FIG. 7 more clearly shows an example of the mounting hole 11 having an obround shape. The mounting hole 11 has a first dimension in a first direction parallel to a radial direction of the disc D in a state in which the brake pad 10 is installed in the caliper C on the bicycle and a second dimension in a second direction orthogonal to the first direction that is larger than the first dimension. That is, as can be seen, the height of the mounting hole 11 (which is in a direction parallel to the radial direction of the disc D) is less than the width of the mounting hole 11 (which is in a direction orthogonal to the height and is also parallel to the circumferential direction of the disc D). The second direction is parallel to a longitudinal direction of the brake pad. In this embodiment, the width dimension (in the second direction) of the mounting hole 11 corresponds to the longitudinal direction of the mounting hole 11 because the width is the longest of the two dimensions of the obround-shaped mounting hole 11. The width dimension of the mounting hole 11 also corresponds to the longitudinal direction of the support plate 12 and the longitudinal direction of the brake pad 10.

Dimensionally, as one example, the height of the mounting hole 11 can be substantially the same as a diameter of the mounting pin 20. As explained above, this prevents or reduces movement of the brake pad 10 relative to the mounting pin 20 to prevent or reduce the brake pad 10 from rattling within the caliper C as a result of movement of the brake pad 10 within the caliper C in a direction parallel to the radial direction of the disc D.

As used herein, the term "substantially" provides for dimensional variation due to manufacturing tolerances. For example, it is contemplated that the height of the mounting hole 11 would be substantially the same as the diameter of mounting pin 20 if it is 0.125 mm±0.025 mm larger than a diameter of the pin. As another example, the first dimension is no more than 0.15 mm larger than the diameter of the mounting pin 20. That is, it is contemplated that the height (first dimension) of the mounting hole 11 would be substantially the same as the diameter of mounting pin 20 if it is no more than 0.15 mm larger than a diameter of the mounting pin 20. As another example, the first dimension is no more than 1.05 times the diameter of the mounting pin 20. That is, it is contemplated that the height of the mounting hole 11 would be substantially the same as the diameter of mounting pin 20 if the height were no more than 1.05 times the diameter of mounting pin 20.

Regarding the width of the mounting hole 11, the width can be dimensioned to permit movement in a direction parallel to the circumferential direction of the disc D. As an example, the width can be at least 0.625 mm larger than a diameter of the pin. As another example, the width can be larger than 1.2 times a diameter of the pin. As another example, the width can be larger than 1.1 times the height. As described above, these widths allow for easier mounting of the brake pad 10 on the mounting pin 20 because rattling resulting from movement in a direction orthogonal to the radial direction of the disc D is either less of a concern and/or can be prevented by other structure within the caliper C.

As shown in FIGS. 4 and 5, the brake pad 10 can optionally include a cooling fin 18. That is, one or more cooling fins 18 can be molded as part of the support plate 12. Alternatively, one or more cooling fins 18 can be separately constructed of a same or different material form the support plate 12 and then attached to the support plate 12. The cooling fin 18 is provided on a first side of the support plate 12 with respect to the mounting hole 11 in the second direction, and the friction member 16 is supported on a second side of the support plate 12 opposite to the first side with respect to the mounting hole 11 in the second direction. That is, cooling fins 18 can be located on the outer facing surface of the brake pad 10 (surface opposite the friction member 16) and extend outside of the caliper C so that they are exposed to a relative wind when the bicycle is moving to dispel heat that has been generated by the friction of the friction member during braking.

Figure 8:
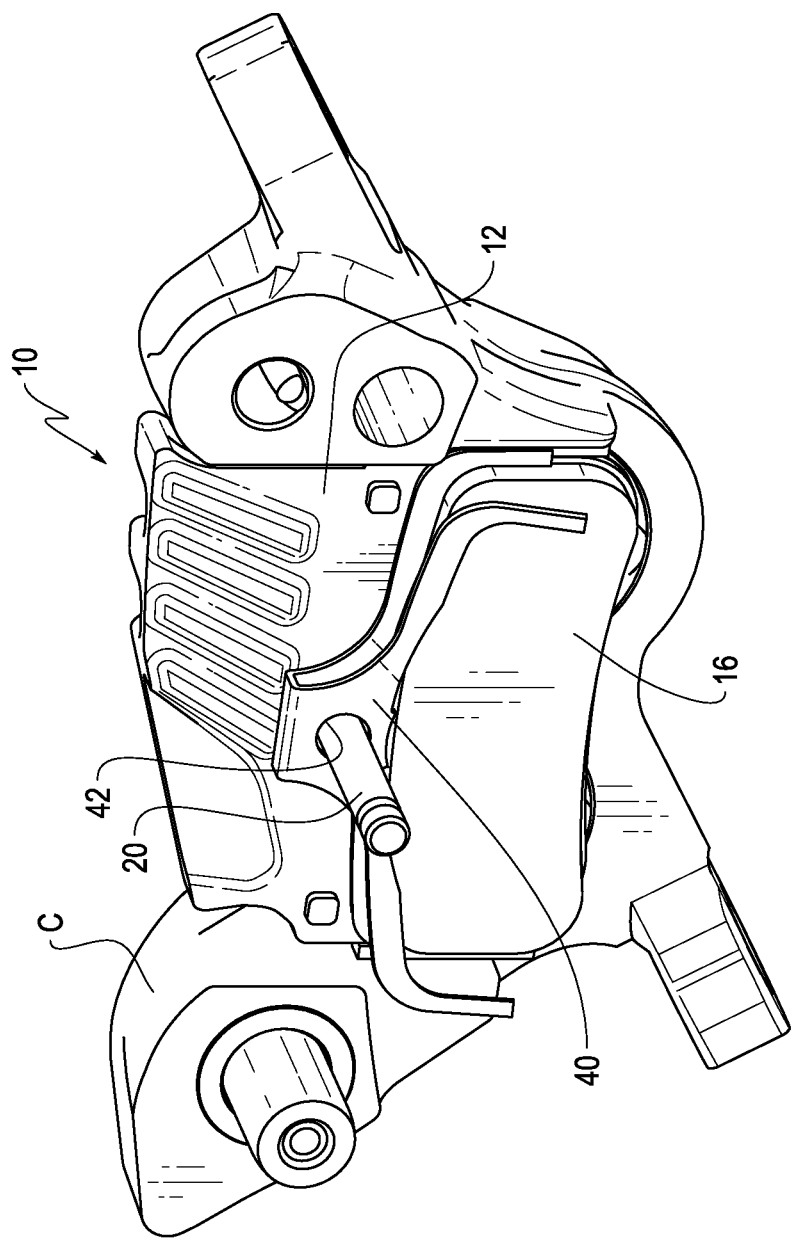
FIG. 8 shows an exemplary embodiment of the caliper with a part of the caliper removed.
Figure 9:
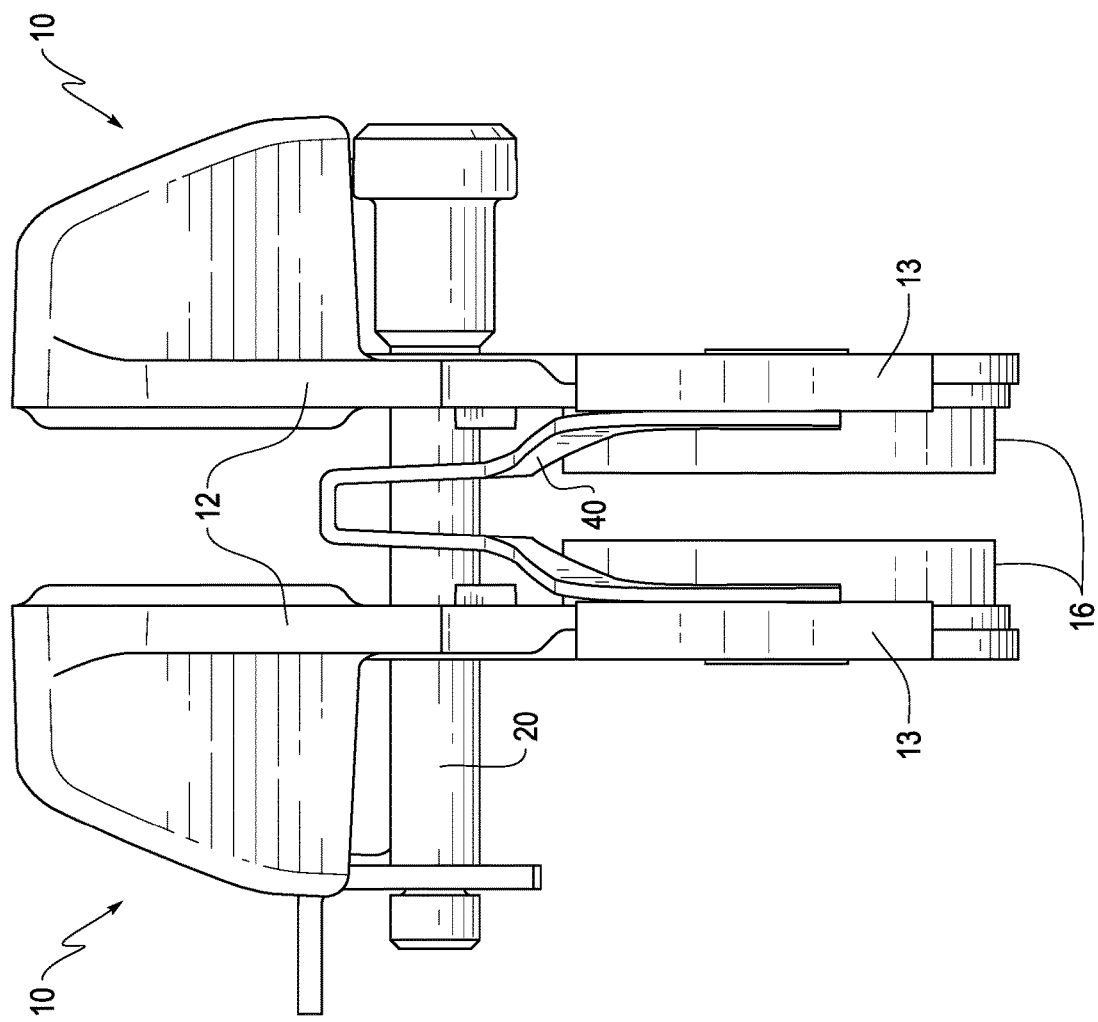
FIG. 9 shows the exemplary embodiment of the caliper with a part of the caliper removed

As shown in FIGS. 8 and 9, the caliper C can include a pad fixing spring 40. The pad fixing spring 40 contacts the support plate 12 of each brake pad 10 at parts of the support plate 12 that are adjacent to the friction member 16. In so doing, the pad fixing spring 40 biases the brake pads 10 away from the disc D and towards an inner surface of the caliper C so that the brake pads 10 are in a proper position relative to the disc D and/or the caliper C especially when the brake pads 10 are in a non-braking position (no force applied to the actuator). The pad fixing spring 40 can be made of a resilient material such as, for example, steel, any other alloy, or even carbon fiber. The pad fixing spring 40 includes a spring mounting hole 42 through which the mounting pin 20 is inserted. As shown in FIG. 8, the shape of the spring mounting hole 42 can be circular. But, beneficially, the spring mounting hole 42 can have the same shape as the mounting hole 11. By biasing the brake pads 10 away from the disc D and towards an inner surface of the caliper C and/or by the spring mounting hole 42 having the same shape as the mounting hole 11, the pad fixing spring 40 helps to further prevent unwanted rattling of the brake pads 10 within the housing of the caliper C.

In the above description and appended claims, the term "comprising" and its derivatives, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include," and their derivatives. As used herein, terms "radial" and "circumferential" are terms relating to the radius and circumference of the disc D. Although the term circumferential can sometimes refer to a curved or circular direction, as used herein, a direction parallel to straight line tangent to the circumference of the disc C at each radial location is what is meant by the circumferential direction at that radial location. Further, as used herein the term "longitudinal" is used to refer to a dimension or direction corresponding to the longest side of an object.

While exemplary embodiments have been described to explain the inventive principles, it will be apparent to a skilled artisan that various changes and modifications can be made herein without departing from the broad inventive principles. For example, the size, shape, location or orientation of the various components can be changed as needed and/or desired as long as the intended result is achieved to at least some degree. Components that are shown directly connected or contacting each other can have intermediate structures disposed between them. The functions of one element can be performed by two, and vice versa. It is not necessary for all of the advantages described herein to be achieved by a particular embodiment at the same time. Thus, the foregoing descriptions of the exemplary embodiments need not limit the appended claims unless expressly recited therein.

What is claimed is:

1. A brake for a bicycle, comprising:
   a caliper, including:
      a housing configured to be mounted to the bicycle, the housing having:
         a downstream end that is an end of the housing in a circumferential direction of rotation of a disc within the housing when the housing is in a state in which the caliper is mounted to the bicycle; and
         an upstream end that is an end of the housing opposite the downstream end in the circumferential direction of rotation of the disc within the housing when the housing is in the state in which the caliper is mounted to the bicycle;
   a pin located within the housing; and
   a brake pad, including:
      a friction member configured to contact the disc in a state in which the brake pad is installed in the caliper on the bicycle; and
      a support plate supporting the friction member, the support plate including a mounting hole, the mounting hole having:
         a first dimension in a first direction parallel to a radial direction of the disc in a state in which the brake pad is installed in the caliper on the bicycle;
         a second dimension in a second direction orthogonal to the first direction, the second dimension being larger than the first dimension;
         an upstream end at an end closest to the upstream end of the housing along the second direction in the state in which the brake pad is installed in the caliper; and a downstream end at an end closest to the downstream end of the housing along the second direction in the state in which the brake pad is installed in the caliper, wherein the mounting hole is configured to accept the pin for mounting the brake pad in the caliper such that, in the state in which the brake pad is installed in the caliper, the pin is located in the upstream end of the mounting hole.

2. The brake according to claim 1, wherein the second dimension is sized so that the pin permits movement of the brake pad in the second direction in the state in which the brake pad is installed in the caliper on the bicycle.

3. The brake according to claim 1, wherein the first dimension is sized so that the pin prevents movement of the brake pad in the first direction in the state in which the brake pad is installed in the caliper on the bicycle.

4. The brake according to claim 1, wherein the second direction is parallel to a longitudinal direction of the brake pad.

5. The brake according to claim 1, wherein the first dimension is substantially the same as a diameter of the pin.

6. The brake according to claim 5, wherein the first dimension is no more than 0.15 mm larger than the diameter of the pin.

7. The brake according to claim 5, wherein the first dimension is no more than 1.05 times the diameter of the pin.

8. The brake according to claim 5, wherein the second dimension is at least 0.625 mm larger than a diameter of the pin.

9. The brake according to claim 1, wherein the second dimension is larger than 1.2 times a diameter of the pin.

10. The brake according to claim 1, wherein the second dimension is larger than 1.1 times the first dimension.

11. The brake according to claim 1, wherein the second dimension is sized to allow the brake pad to move in the second direction in the state in which the brake pad is installed in the caliper on the bicycle.

12. The brake according to claim 1, wherein the mounting hole is in a shape of an obround.

13. The brake according to claim 1, wherein the mounting hole has at least two parallel sides.

14. The brake according to claim 1, wherein the support plate includes a cooling fin.

15. The brake according to claim 14, wherein the cooling fin is provided on a first side of the support plate with respect to the mounting hole in the second direction, and the friction member is supported on a second side of the support plate opposite to the first side with respect to the mounting hole in the second direction.

16. The brake according to claim 15, wherein:
the brake pad is a first brake pad;
the friction member is a first friction member; and
the brake further comprises:
a second brake pad;
a second friction member attached to the second brake pad and configured to contact the disc in the state in which the brake pad is installed in the caliper on the bicycle;
a first piston configured to contact the first brake pad and be hydraulically actuated to move the first brake pad so that the first friction member contacts the disc in the state in which the brake pad is installed in the caliper and the caliper is mounted to the bicycle; and
a second piston configured to contact the second brake pad and be hydraulically actuated to move the second brake pad so that the second friction member contacts the disc in the state in which the brake pad is installed in the caliper and the caliper is mounted to the bicycle.

17. The brake according to claim 16, wherein
the cooling fin is a first cooling fin;
the second brake pad includes a second cooling fin; and
the housing:
extends over a radial end of the disc at an upstream portion at the upstream end of the housing and extends over the radial end of the disc at a downstream portion at the downstream end of the housing; and
allows the first cooling fin and second cooling fin to extend outside the housing between the upstream portion and the downstream portion so that the first cooling fin and second cooling fin are exposed to a relative wind in the state in which the brake pad is installed in the caliper and the caliper is mounted to the bicycle.

18. A brake for a bicycle, comprising:
a caliper, including:
a housing configured to be mounted to the bicycle, the housing having:
a downstream end that is an end of the housing in a circumferential direction of rotation of a disc within the housing when the housing is in a state in which the caliper is mounted to the bicycle; and
an upstream end that is an end of the housing opposite the downstream end in the circumferential direction of rotation of the disc within the housing when the housing is in the state in which the caliper is mounted to the bicycle;
a pin located within the housing; and
a brake pad, including:
a friction member configured to contact the disc in a state in which the brake pad is installed in the caliper on the bicycle; and
a support plate supporting the friction member, the support plate including a mounting hole, the mounting hole having:
a first dimension sized to prevent movement in a first direction parallel to a radial direction of the disc in a state in which a pin is inserted into the mounting hole while the brake pad is installed in the caliper on the bicycle; and
a second dimension sized to permit movement in a second direction orthogonal to the first direction in the state in which the pin is inserted into the mounting hole while the brake pad is installed in the caliper on the bicycle;
an upstream end at an end closest to the upstream end of the housing along the second direction in the state in which the brake pad is installed in the caliper; and
a downstream end at an end closest to the downstream end of the housing along the second direction in the state in which the brake pad is installed in the caliper,
wherein the mounting hole is configured to accept the pin for mounting the brake pad in the caliper such that, in the state in which the brake pad is installed in the caliper, the pin is located in the upstream end of the mounting hole.

19. A brake for a bicycle, comprising:
a caliper, including:
- a housing configured to be mounted to the bicycle, the housing having:
  - a downstream end that is an end of the housing in a circumferential direction of rotation of a disc within the housing when the housing is in a state in which the caliper is mounted to the bicycle; and
  - an upstream end that is an end of the housing opposite the downstream end in the circumferential direction of rotation of the disc within the housing when the housing is in the state in which the caliper is mounted to the bicycle;
- a pin located within the housing; and
- a brake pad, including:
  - a friction member configured to contact the disc in a state in which the brake pad is installed in the caliper on the bicycle; and
  - a support plate supporting the friction member, the support plate including a mounting hole configured to accept the pin, the mounting hole being in a shape of an obround, the mounting hole being oriented so that a longitudinal direction of the mounting hole corresponds to a longitudinal direction of the support plate, the mounting hole having:
    - an upstream end at an end closest to the upstream end of the housing along the longitudinal direction in the state in which the brake pad is installed in the caliper; and
    - a downstream end at an end closest to the downstream end of the housing along the longitudinal direction in the state in which the brake pad is installed in the caliper, wherein the mounting hole is configured to accept the pin for mounting the brake pad in the caliper such that, in the state in which the brake pad is installed in the caliper, the pin is located in the upstream end of the mounting hole.

\* \* \* \* \*